United States Patent
Yamashita

(10) Patent No.: US 10,576,823 B2
(45) Date of Patent: Mar. 3, 2020

(54) IMAGE DISPLAY SYSTEM

(71) Applicant: AISIN SEIKI KABUSHIKI KAISHA, Kariya-shi, Aichi (JP)

(72) Inventor: Norichika Yamashita, Kariya (JP)

(73) Assignee: AISIN SEIKI KABUSHIKI KAISHA, Kariya-shi, Aichi (JP)

( * ) Notice: Subject to any disclaimer, the term of this patent is extended or adjusted under 35 U.S.C. 154(b) by 0 days.

(21) Appl. No.: 16/302,849

(22) PCT Filed: Mar. 24, 2017

(86) PCT No.: PCT/JP2017/011924
§ 371 (c)(1),
(2) Date: Nov. 19, 2018

(87) PCT Pub. No.: WO2017/208586
PCT Pub. Date: Dec. 7, 2017

(65) Prior Publication Data
US 2019/0299782 A1     Oct. 3, 2019

(30) Foreign Application Priority Data

May 30, 2016    (JP) ................................ 2016-107652

(51) Int. Cl.
*H04N 7/18*     (2006.01)
*B60K 35/00*     (2006.01)
(Continued)

(52) U.S. Cl.
CPC ............... *B60K 35/00* (2013.01); *B60R 1/00* (2013.01); *G03B 15/00* (2013.01); *H04N 7/18* (2013.01);
(Continued)

(58) Field of Classification Search
CPC ........ H04N 7/18; B60R 1/00; B60R 2300/20; B60R 2300/8046; B60R 2300/30; G03B 15/00; B60K 35/00
See application file for complete search history.

(56) References Cited

U.S. PATENT DOCUMENTS 6,891,563 B2 * 5/2005 Schofield .................. B60R 1/00
348/143
9,928,805 B2 * 3/2018 Fiedler ................ G06F 11/1004
(Continued)

FOREIGN PATENT DOCUMENTS

| JP | 2004-064440 A | 2/2004 |
| JP | 2004-214970 A | 7/2004 |
| JP | 2008-252307 A | 10/2008 |

OTHER PUBLICATIONS

International Search Report for PCT/JP2017/011924 dated Jun. 13, 2017 [PCT/ISA/210].

*Primary Examiner* — Neil R Mikeska
(74) *Attorney, Agent, or Firm* — Sughrue Mion, PLLC

(57) ABSTRACT

An image display system includes an image capturing unit that is to be mounted on a vehicle, and is configured to capture an image of surroundings of the vehicle, a display unit configured to display a captured image captured by the image capturing unit, an image-capturing range modification unit configured to modify an image-capturing range of the image capturing unit when the vehicle is stopped, a comparison unit configured to compare an image captured before the image-capturing range is modified by the image-capturing range modification unit with an image captured after the image-capturing range is modified by the image-capturing range modification unit, and calculate a difference value therebetween, and a determination unit configured to determine whether or not there is an abnormality in the image capturing unit based on the difference value.

6 Claims, 3 Drawing Sheets

(51) Int. Cl.
    *B60R 1/00*        (2006.01)
    *G03B 15/00*     (2006.01)

(52) U.S. Cl.
    CPC ....... *B60R 2300/20* (2013.01); *B60R 2300/30* (2013.01); *B60R 2300/8046* (2013.01)

(56) References Cited

U.S. PATENT DOCUMENTS

| | | | |
|---|---|---|---|
| 10,227,813 B2* | 3/2019 | Ryu | B60W 50/08 |
| 2004/0101166 A1* | 5/2004 | Williams | G01P 3/38 |
| | | | 382/104 |
| 2005/0206726 A1* | 9/2005 | Yoshida | H04N 7/181 |
| | | | 348/143 |
| 2007/0013777 A1* | 1/2007 | Inoue | H04N 5/232 |
| | | | 348/143 |
| 2010/0141412 A1* | 6/2010 | Partin | G08G 1/205 |
| | | | 340/426.18 |
| 2012/0200700 A1* | 8/2012 | Bennett | G01S 17/026 |
| | | | 348/143 |
| 2013/0094705 A1* | 4/2013 | Tyagi | G06K 9/00369 |
| | | | 382/103 |
| 2016/0358358 A1* | 12/2016 | Fujio | B60R 1/00 |
| 2017/0339375 A1* | 11/2017 | Sychta | G06K 9/00791 |
| 2018/0209823 A1* | 7/2018 | Kirsch | B66C 13/46 |

* cited by examiner

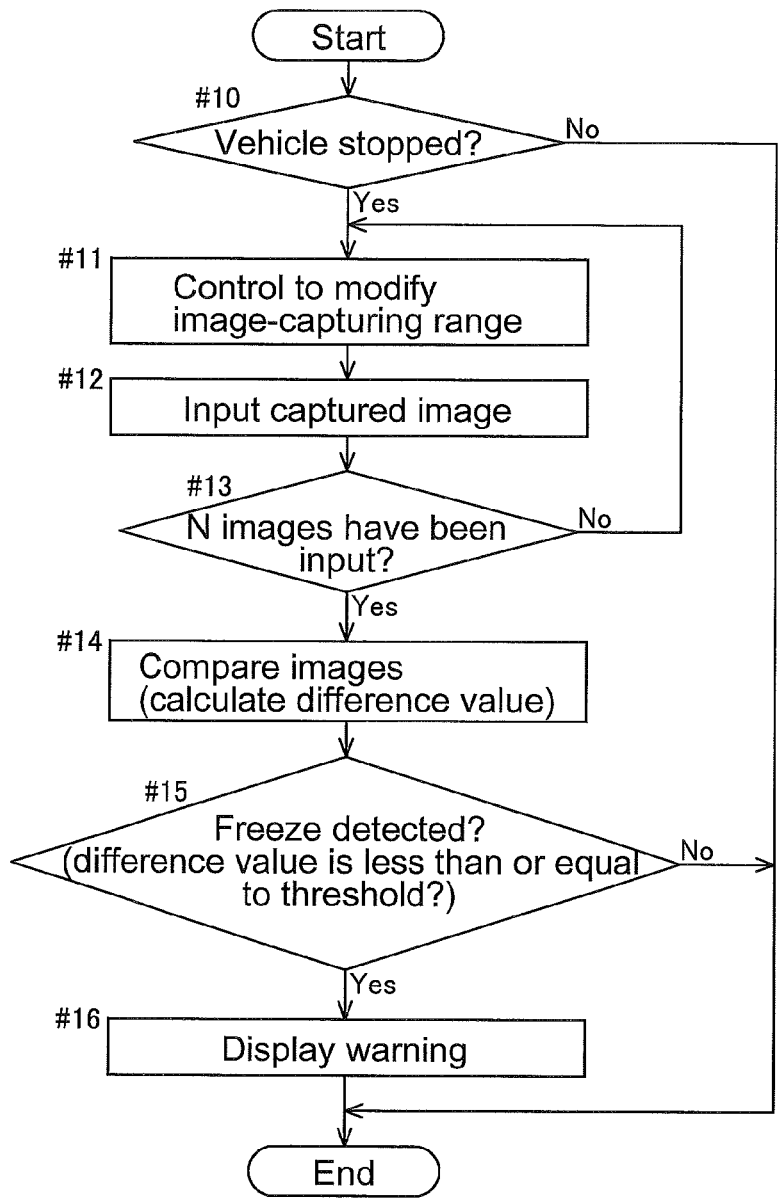

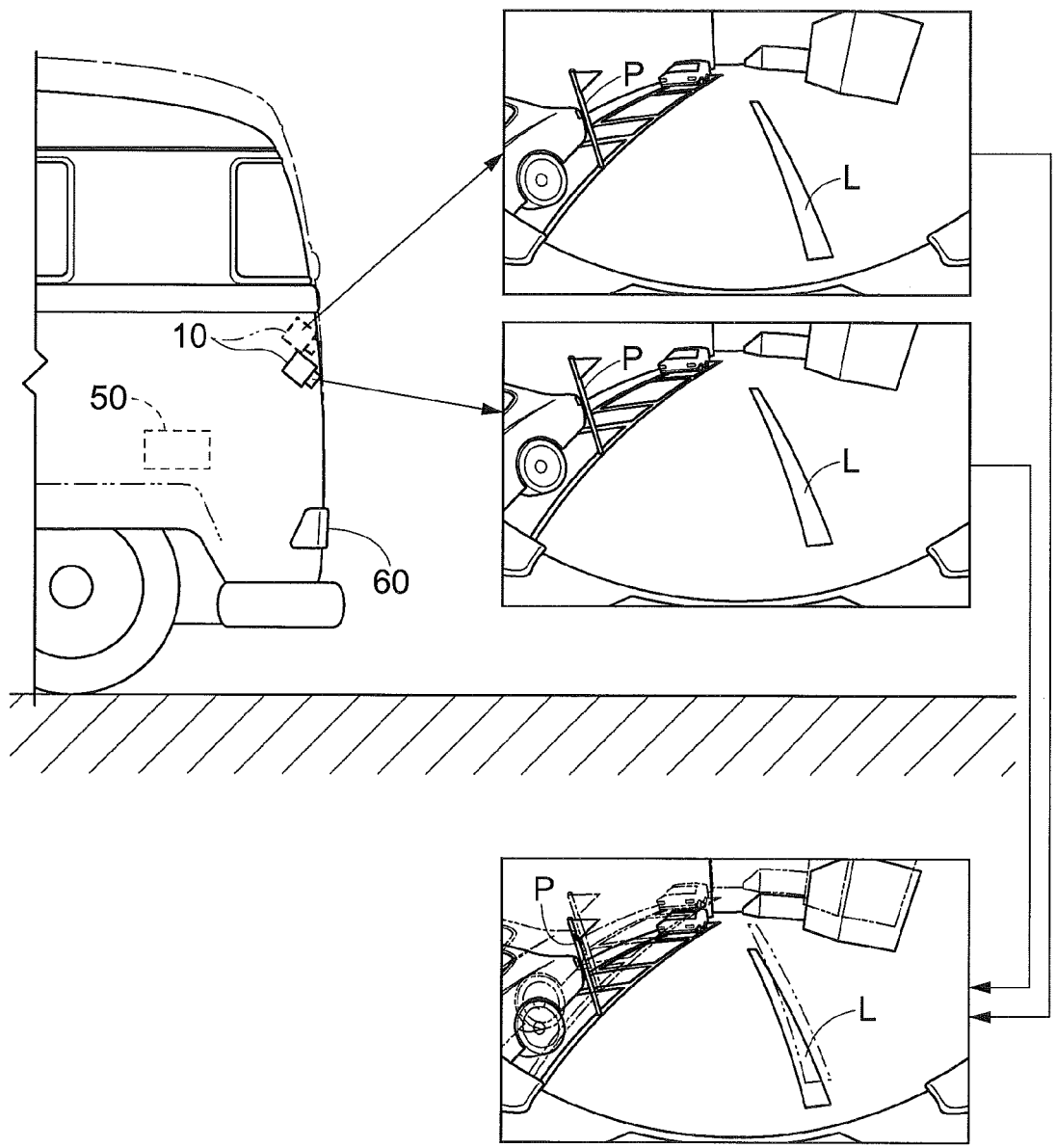

IMAGE DISPLAY SYSTEM

CROSS REFERENCE TO RELATED APPLICATIONS

This application is a National Stage of International Application No. PCT/JP2017/011924 filed Mar. 24, 2017, claiming priority based on Japanese Patent Application No. 2016-107652 filed May 30, 2016.

TECHNICAL FIELD

The present invention relates to an image display system that displays, on a display unit, a captured image captured by an image capturing unit that is mounted on a vehicle.

BACKGROUND ART

An image display system including a vehicle-mounted image capturing unit and a display unit on which an image captured by the image capturing unit is displayed is used as a device for assisting driving of a vehicle such as an automobile. Occasionally, a failure may occur in the image capturing unit, resulting in a state (hereinafter referred to as "freeze") in which the captured image displayed on the display unit is fixed and does not change.

Image display systems exist that monitor changes in captured images obtained from the image capturing unit as the vehicle moves, in order to detect that a captured image has frozen. For example, the image display system described in Patent Document 1 includes a difference detection means that detects a difference between image frames that are successively output from an image capturing unit, and it is determined that a display image is frozen if no difference is detected between successive image frames while the vehicle is traveling.

When the vehicle is traveling, the number of frames of captured images used to determine whether or not a display image is frozen increases, thus increasing the overall data amount of captured images. To reduce the data amount for the freeze determination, in the image display system described in Patent Document 2, a white or black detection image that is inverted for each frame is added to a specific region of a captured image, and it is determined that freezing of a captured image has not occurred if a white image and a black image are repeatedly contained in successive captured images as detection images contained in the specific region.

PRIOR ART DOCUMENTS

Patent Documents

Patent Documents 1: JP 2004-64440A
Patent Documents 2: JP 2008-252307A

DISCLOSURE OF THE INVENTION

Problem to be Solved by the Invention

The technique described in Patent Document 1 detects a difference between successive image frames that are output from the image capturing unit while the vehicle is traveling, and therefore the size of a buffer that is required to temporarily store the image data captured by a vehicle-mounted camera increases, thus increasing the cost of a circuit. If successive captured images hardly change due to little change in the environment surrounding the vehicle even when the vehicle is traveling, it may be erroneously determined that a captured image is frozen.

On the other hand, the technique described in Patent Document 2 requires a smaller amount of data used to determine whether or not a captured image is frozen. However, it is necessary to separately provide the function for adding an image signal for freeze determination to captured images of the camera. In addition, even when there is no defect in a captured image, it may be erroneously determined that a captured image is frozen if the signal added to the captured image is not properly displayed.

Therefore, there is a need for an image display system that can reliably detect an abnormality in the image capturing unit using a simple configuration.

Means for Solving Problem

A characteristic feature of the image display system according to the present invention, the image display system comprises:

an image capturing unit that is to be mounted on a vehicle, and is configured to capture an image of surroundings of the vehicle;

a display unit configured to display a captured image captured by the image capturing unit;

an image-capturing range modification unit configured to modify an image-capturing range of the image capturing unit when the vehicle is stopped;

a comparison unit configured to compare an image captured before the image-capturing range is modified by the image-capturing range modification unit with an image captured after the image-capturing range is modified by the image-capturing range modification unit, and calculate a difference value therebetween; and a determination unit configured to determine whether or not there is an abnormality in the image capturing unit based on the difference value.

The present configuration includes the image-capturing range modification unit, and an image captured before the image-capturing range is modified is compared with an image captured after the image-capturing range is modified when the vehicle is stopped, and determines whether or not the captured image is frozen. That is, the image-capturing range of the image capturing unit is intentionally modified while the vehicle is stopped, and whether or not the captured image is frozen is determined in a state in which the captured image has definitely changed. Consequently, the accuracy of determination as to whether or not the captured image is frozen is increased in the image display system.

In addition, whether or not the captured image is frozen can be determined when the vehicle is in a stopped state, and therefore, it is not necessary to store a large amount of image data of captured images that are obtained while the vehicle is traveling as in conventional configurations.

Furthermore, since images captured before and after the image-capturing range is modified are compared, it is also not necessary to add a signal to a captured image, thus making it possible to detect a defect in a captured image itself.

Accordingly, it is possible to reliably detect that a captured image has frozen using a simple configuration, and whether or not there is an abnormality in the image capturing unit can be properly determined.

Another characteristic feature of the image display system according to the present invention lies in that the determination unit determines that there is an abnormality in the image capturing unit if the difference value is smaller than a predetermined threshold.

If the difference value calculated by the comparison unit is smaller than a predetermined threshold, the position of the image-capturing target has hardly changed between different captured images, and it is highly likely that a captured image is frozen. Therefore, in the present configuration, the determination unit determines that there is an abnormality in the image capturing unit if the difference value is smaller than the predetermined threshold. Accordingly, it is possible to reliably detect that a captured image has frozen and there is an abnormality in the image capturing unit.

Another characteristic feature of the image display system according to the present invention lies in that the image-capturing range modification unit modifies the image-capturing range by changing the height of the vehicle.

With the present configuration, the image-capturing range modification unit modifies the image-capturing range by changing the height of the vehicle, and it is thus possible to reliably modify the image-capturing range, for example, when starting the engine of the vehicle.

Another characteristic feature of the image display system according to the present invention lies in that the image-capturing range modification unit modifies the image-capturing range by changing an angle of elevation of the image capturing unit relative to an image-capturing target.

With the present configuration, the image-capturing range modification unit modifies the image-capturing range by changing the angle of elevation of the image capturing unit relative to an image-capturing target, and it is thus possible to modify the image-capturing range without providing a mechanism or the like for changing the position of the vehicle.

Another characteristic feature of the image display system according to the present invention lies in that the image display system further includes a stationary object detection unit configured to detect a stationary object contained in the captured image and a position of the stationary object in the captured image. The comparison unit calculates the difference value based on the position of the stationary object.

The present configuration includes the stationary object detection unit that detects a stationary object contained in the captured image, and the comparison unit calculates the difference value based on the position of the stationary object. Accordingly, it is possible to determine whether or not there is an abnormality in the image capturing unit based on a small amount of data.

Another characteristic feature of the image display system according to the present invention lies in that the image display system further includes a vehicle illumination unit configured to illuminate the image-capturing range. The luminance of the vehicle illumination unit is modified before and after the image-capturing range is modified by the image-capturing range modification unit.

When the surroundings of the vehicle are dark such as when it is nighttime or the like, a change in images captured before and after the image-capturing range is modified may not be successfully detected. Therefore, the present configuration further includes the vehicle illumination unit that illuminates the image-capturing range, and the luminance of the vehicle illumination unit is modified before and after the image-capturing range is modified by the image-capturing range modification unit. When it is hard to make out the captured image because the surroundings of the vehicle are dark, the luminance of the vehicle illumination unit is increased. Conversely, when it is hard to make out the captured image because the luminance of the vehicle illumination unit is high, the luminance of the vehicle illumination unit is decreased. Accordingly, the captured image can be properly made out, and whether or not the captured image is frozen can be properly determined. As a result, an abnormality in the image capturing unit can be more reliably detected.

BRIEF DESCRIPTION OF THE DRAWINGS

FIG. 2 is a flowchart illustrating a determination procedure.
FIG. 3 is a diagram showing a captured image that changes as a captured image range is modified.

BEST MODE FOR CARRYING OUT THE INVENTION

Figure 1:
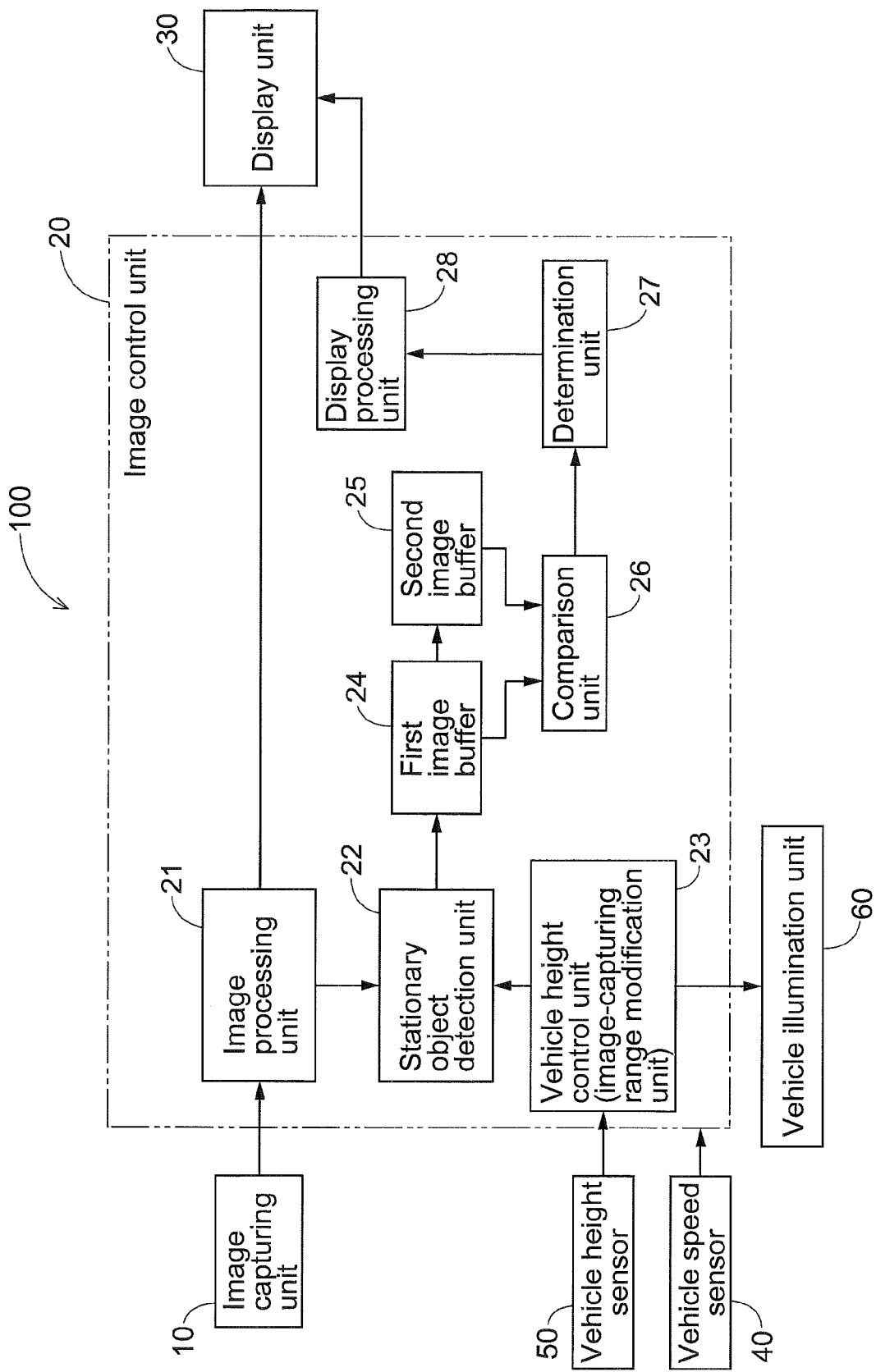
FIG. 1 is a block diagram of an image display system.

In the following, an embodiment of the present invention will be described in detail with reference to the drawings.

An image display system 100 shown in FIG. 1 displays captured images of the surroundings of a vehicle that are captured by an image capturing unit 10 mounted on the vehicle.

As shown in FIG. 1, the image display system 100 includes an image capturing unit 10, an image control unit 20, and a display unit 30. The image capturing unit 10 includes a camera using, for example, a CCD or the like, and is mounted on a vehicle and captures images of the surroundings of the vehicle. A captured image that has been input from the image capturing unit 10 is subjected to image processing or the like by the image control unit 20, and is then output to the display unit 30. The display unit 30 is provided in an internal space or the like of the vehicle, and displays a captured image captured by the image capturing unit 10. The image capturing unit 10, the image control unit 20, and the display unit 30 are connected to each other via a wired connection or a wireless connection.

The image control unit 20 includes an image processing unit 21, a stationary object detection unit 22, a vehicle height control unit 23 (an example of an image-capturing range modification unit), a comparison unit 26, a determination unit 27, and a display processing unit 28. These functional units are each configured by software centered on a CPU executing various types of processing or on a memory, or hardware and software working in conjunction with each other. The image processing unit 21 performs image processing for displaying, on the display unit 30, a captured image obtained from the image capturing unit 10. The captured image that has been processed by the image processing unit 21 is output to the display unit 30 for display, and is also output to the stationary object detection unit 22. The stationary object detection unit 22 detects a stationary object contained in the captured image input from the image processing unit 21, and the position of the stationary object in the captured image.

Here, a stationary object is an object that is present in the surroundings of the vehicle, and whose position will not change. For example, a stationary object corresponds to all objects that are present and not moving on the ground (ground objects), including a division line (white line) L provided on the road surface, a sign, and a pole P that are contained in the display image shown in FIG. 3. The stationary object contained in the captured image is detected based on the shape, luminance information, and the like. For example, the division line L provided on the road surface can be detected by using a known automatic recognition technique. The stationary object detection unit 22 detects a stationary object (e.g., the division line L), for example, by extracting edges from a captured image. More specifically, the stationary object detection unit 22 detects a stationary object by extracting a luminance change point (feature point) that is greater than or equal to a prescribed threshold. The stationary object detection unit 22 may perform the detection by using one such stationary object, or two or more of the stationary objects in combination.

The vehicle height control unit 23 is provided as the image-capturing range modification unit, and modifies the image-capturing range of the image capturing unit 10 when the vehicle is stopped. The vehicle height control unit 23 controls the vehicle height based on a value detected by a vehicle height sensor 50 included in the vehicle. When the height of the vehicle has been modified by the vehicle height control unit 23, and the vehicle height is made higher by a predetermined amount than that before modification, for example, the image-capturing range of the image capturing unit 10 is modified as shown in FIG. 3. The vehicle height control unit 23 may perform control such that the height of the vehicle is made lower than that before modification. The height of the vehicle may be modified vertically, for example, by extending or compressing an air suspension of the vehicle, or using an electromagnetic suspension or the like.

The comparison unit 26 is connected to the determination unit 27, and compares a stationary object contained in an image captured before the image-capturing range is modified by the vehicle height control unit 23 with a stationary object contained in the image captured after the image-capturing range is modified, and calculates a difference value therebetween. Specifically, image data relating to the position of a stationary object in a captured image that is output from the stationary object detection unit 22 is temporarily stored in a first image buffer 24 and a second image buffer 25, and the difference value between the two pieces of image data are calculated by the comparison unit 26. The difference value between the pieces of image data is calculated based on the amount of positional change or the like of the stationary object (e.g., the contour portion, etc.) in the captured image.

The determination unit 27 determines whether or not there is an abnormality in the image capturing unit 10 based on the difference value calculated by the comparison unit 26. In the present embodiment, the determination unit 27 determines that there is an abnormality in the image capturing unit 10 if the difference value is smaller than a predetermined threshold. This is based on the fact that, if the difference value is smaller than a predetermined threshold, the position of a stationary object contained in a captured image has barely changed before and after modification of the image-capturing range, and it is highly likely that a captured image is frozen.

The vehicle is provided with a vehicle speed sensor 40 that detects the movement speed. The vehicle speed sensor 40 is connected to the image control unit 20, and the speed data of the vehicle is input to the image control unit 20 from the vehicle speed sensor 40. If it is determined that the vehicle is in a moving state based on the speed data obtained from the vehicle speed sensor 40, the image control unit 20 does not perform the determination processing on the captured image. Conversely, if it is determined that the vehicle is in a stopped state, the image control unit 20 performs the detection and determination of the position of the stationary object in the captured image.

If it is determined by the determination unit 27 that there is an abnormality in the image capturing unit 10 when the difference value is smaller than the predetermined threshold, the display processing unit 28 provides a notification to the display unit 30 by sending an alert message thereto. Upon receiving a determination signal indicating an abnormality from the determination unit 27, the display processing unit 28 outputs an alert message (notification message) and an instruction to display the alert message to the display unit 30. The alert message is stored in a ROM (not shown) of the display processing unit 28. The display processing unit 28 operates as a notification unit that provides a notification indicating that the captured image is frozen and there is an abnormality in the image capturing unit 10.

The display unit 30 is capable of, for example, composite display (superimposed display) in which characters (alert message) are displayed overlapping a display image.

The display processing unit 28 sends an alert message and an instruction for superimposed display to the display unit 30, and causes the display unit 30 to display the alert message in a superimposed manner.

A procedure for the detecting that a captured image has frozen and the display of an alert performed in the image display system 100 will be described with reference to the flowchart shown in FIG. 2.

First, whether or not the vehicle is stopped is checked based on the speed data from the vehicle speed sensor 40 (step #10). Based on the speed data of the vehicle speed sensor 40, if it is determined that the vehicle is travelling at a vehicle speed exceeding a predetermined speed (step #10, No), the subsequent processing will not be performed.

If it is determined that the vehicle speed is zero, or less than or equal to the predetermined speed and the vehicle is stopped (step #10, Yes), the vehicle height control unit 23 performs control to modify the image-capturing range (step #11), and a captured image is input to the stationary object detection unit 22 (step #12). The control to modify the image-capturing range is continued until a predetermined number of captured images (a plurality of N captured images) are input, and the image-capturing range is modified (step #11 to 13). The input of captured images as per step #13 may be performed for a predetermined period of time, instead of capturing a predetermined number of captured images.

Of N pieces of captured image data that have been input to the stationary object detection unit 22, for example, the leading image data is stored in the first image buffer 24, and the last image data is stored in the second image buffer 25 (see FIG. 3). Then, the first image and the second image are compared by the comparison unit 26 (step #14). Specifically, the comparison unit 26 calculates a difference value between the first image and the second image. Note that the N pieces of captured image data that have been input to the stationary object detection unit 22 may be alternately stored in the first image buffer 24 and the second image buffer 25, and the comparison unit 26 may compare the first image and the second image. In this case, the determination unit 27 may compare an average, a total, or the like of all difference values with the predetermined threshold.

Next, based on the difference value calculated by the comparison unit 26, the determination unit 27 detects that a captured image has frozen (step #15). Specifically, the determination unit 27 determines whether the difference value is less than or equal to the predetermined threshold. If it is determined by the determination unit 27 that the difference value is less than or equal to the threshold (step #15, Yes), a freeze is detected, and a signal instructing to display a warning such as an alert message is sent from the determination unit 27 to the display processing unit 28, and the warning is displayed on the display unit 30 (step #16).

In the present embodiment, the stationary object detection unit 22 detects a stationary object contained in a captured image and the position of the stationary object, and only the data on the position of the stationary object in the captured image is temporarily stored in the first image buffer 24 and the second image buffer 25. A stationary object may be, for example, the division line L on the road surface that is shown in the display image in FIG. 3.

The stationary object detection unit 22 may detect an entire stationary object contained in the captured image, or may detect a portion of a stationary object. Specifically, the stationary object detection unit 22 may detect an edge portion of the stationary object and the position of the edge portion in the captured image. In that case, the determination unit 27 performs the determination based on the position of the edge portion of the stationary object. An edge portion of the stationary object may be, for example, an end portion or the like of the division line L on the road surface that is shown in the display image in FIG. 3. Note that the determination based on the position of the edge portion of the stationary object may be performed based on one edge portion of the stationary object, or may be performed based on a line segment connecting a plurality of edge portions.

Thus, as a result of the determination unit 27 making a determination based on the position of an edge portion or the like, which is a portion of the stationary object, it is possible to further reduce the amount of data used to detect an abnormality in successive captured images.

Of the stationary object contained in the captured image, the position of a portion extending continuously along the height direction of the vehicle may hardly change between successive captured images even when the captured images are displayed normally. Accordingly, it may be determined by the determination unit 27 that the position of the stationary object in the captured images has not changed even when successive captured images are displayed normally.

Therefore, it is preferable that the stationary object detection unit 22 detects the position of a portion of the stationary object contained in the captured image that is non-parallel to the height direction of the vehicle. The portion of the stationary object that is non-parallel to the height direction of the vehicle corresponds, for example, to the division line L on the road surface that is shown in FIG. 3. The portion of the stationary object that is non-parallel to the height direction of the vehicle is a portion whose position in the captured image changes as the vehicle height fluctuates and the image-capturing range is modified. Accordingly, an abnormality in the image capturing unit 10 can be reliably detected by the determination unit 27.

When the surroundings of the vehicle are dark such as when it is nighttime or the like, a change in a captured image may not be detected even if the image-capturing range is modified. As shown in FIG. 1, the vehicle includes a vehicle illumination unit 60 that illuminates the image-capturing range. Therefore, the luminance of the vehicle illumination unit 60 may be modified before and after the image-capturing range is modified by the vehicle height control unit 23. For example, when the image capturing unit 10 is provided at the rear of the vehicle and captures images of that rearward of the vehicle, the luminance of a brake lamp or the like serving as the vehicle illumination unit 60 is modified (the luminance of the brake lamp or the like is increased when the surroundings of the vehicle are dark). This allows the comparison unit 26 to reliably calculate the difference value even at nighttime or the like, thus enabling the determination unit 27 to properly determine the state of the image capturing unit 10. As a result, an abnormality in the image capturing unit 10 can be more reliably detected. Note that the vehicle illumination unit 60 is not limited to a brake lamp, and may be another illumination unit such as a headlamp.

Alternative Embodiments (1) In the above embodiment, an example is shown in which the vehicle height control unit 23 is provided as the image-capturing range modification unit, and modifies the image-capturing range of the image capturing unit 10 by changing the height of the vehicle; however, the image-capturing range modification unit may modify the image-capturing range of the image capturing unit 10 by changing the angle of elevation of the image capturing unit 10 relative to an image-capturing target. The image-capturing range modification unit may include, in place of the vehicle height control unit 23, a mechanism for modifying the image-capturing range by changing the angle of elevation of the image capturing unit 10, or may include both the vehicle height control unit 23 and the mechanism for changing the angle of elevation of the image capturing unit 10.

When both of these elements are provided as the image-capturing range modification unit, for example, the image-capturing range of the image capturing unit 10 is first modified by the vehicle height control unit 23, and the determination unit 27 performs the determination. Here, if the determination unit 27 determines that the captured image is frozen, the angle of elevation of the image capturing unit 10 is subsequently changed, and the determination unit 27 performs determination. If the determination unit 27 determines that the captured image is frozen in both cases, it is determined that there is an abnormality in the image capturing unit 10. Thus, by changing the means for modifying the image-capturing range and performing the determination by using the determination unit 27 for each of the means, an abnormality in the image capturing unit 10 can be better detected. The above-described order may be reversed, i.e., the image-capturing range of the image capturing unit 10 may be modified first by changing the angle of elevation of the image capturing unit 10, and the image-capturing range of the image capturing unit 10 may then be modified by the vehicle height control unit 23.

(2) In the above embodiment, an example is shown in which the comparison unit 26 compares the positions of the stationary object in the images captured before and after the image-capturing range is modified, and calculates the difference value; however, the comparison unit 26 may compare images (entire captured images) captured before and after the image-capturing range is modified, and calculate the difference value.

(3) In the above embodiment, an example is shown in which the image capturing unit 10 and the display unit 30 are connected to the image control unit 20; however, the image control unit 20 may be provided inside the display unit 30, and the image capturing unit 10 may be connected to the display unit 30.

(4) In the above embodiment, an example is shown in which the image capturing unit 10 includes one camera; however, the image capturing unit 10 may include a plurality of cameras.

(5) In the above embodiment, an example is shown in which the display processing unit 28 is provided as the notification unit, and a warning is displayed on the display unit 30; however, the notification unit is not limited to the display processing unit 28, and may be a unit that provides a warning by using sound or light generated by a speaker, a warning light, or the like that is provided inside the vehicle.

(6) In the above embodiment, an example is shown in which the luminance of the vehicle illumination unit 60 is modified before and after the image-capturing range is modified. Instead, the image display system 100 may modify the luminance of the vehicle illumination unit 60 without modifying the image-capturing range, the comparison unit 26 may compare an image captured before the luminance of the vehicle illumination unit 60 is modified with an image captured after the luminance of the vehicle illumination unit 60 is modified, and calculate a difference value (luminance difference), and the determination unit 27 may determine whether or not there is an abnormality in the image capturing unit 10 based on the difference value.

INDUSTRIAL APPLICABILITY

The present invention can be widely used for an image display system that is mounted on a moving object such as a vehicle.

DESCRIPTION OF REFERENCE SIGNS

10: camera (image capturing unit)
20: image control unit
21: image processing unit
22: stationary object detection unit
23: vehicle height control unit (image-capturing range modification unit)
26: comparison unit
27: determination unit
28: display processing unit
30: display unit
40: vehicle speed sensor
50: vehicle height sensor
60: vehicle illumination unit
100: image display system
L: division line (stationary object)

The invention claimed is:

1. An image display system comprising:
an image capturing unit that is to be mounted on a vehicle, and is configured to capture an image of surroundings of the vehicle;
a display unit configured to display a captured image captured by the image capturing unit;
an image-capturing range modification unit configured to modify an image-capturing range of the image capturing unit when the vehicle is stopped;
a comparison unit configured to compare an image captured before the image-capturing range is modified by the image-capturing range modification unit with an image captured after the image-capturing range is modified by the image-capturing range modification unit, and calculate a difference value therebetween; and
a determination unit configured to determine whether or not there is an abnormality in the image capturing unit based on the difference value.

2. The image display system according to claim 1, wherein
the determination unit determines that there is an abnormality in the image capturing unit if the difference value is smaller than a predetermined threshold.

3. The image display system according to claim 1, wherein
the image-capturing range modification unit modifies the image-capturing range by changing the height of the vehicle.

4. The image display system according to claim 1, wherein
the image-capturing range modification unit modifies the image-capturing range by changing an angle of elevation of the image capturing unit relative to an image-capturing target.

5. The image display system according to claim 1, further comprising
a stationary object detection unit configured to detect a stationary object contained in the captured image and a position of the stationary object in the captured image,
wherein the comparison unit calculates the difference value based on the position of the stationary object.

6. The image display system according to claim 1, further comprising
a vehicle illumination unit configured to illuminate the image-capturing range,
wherein a luminance of the vehicle illumination unit is modified before and after the image-capturing range is modified by the image-capturing range modification unit.

* * * * *